United States Patent [19]

Roider

[11] 4,120,385

[45] Oct. 17, 1978

[54] LOCKING DEVICE FOR A MECHANICAL ANTISKID REGULATOR

[75] Inventor: Willibald Roider, Munich, Fed. Rep. of Germany

[73] Assignee: Knorr-Bremse GmbH, Munich, Fed. Rep. of Germany

[21] Appl. No.: 807,681

[22] Filed: Jun. 17, 1977

[51] Int. Cl.² .............................................. B60T 8/16
[52] U.S. Cl. .................................. 188/181 R; 188/186
[58] Field of Search ..................... 188/134, 135, 181 A, 188/181 R, 180, 186, 187; 303/91, 113

[56] References Cited

U.S. PATENT DOCUMENTS

| 2,281,118 | 4/1942 | Smirl | 188/186 X |
| 3,848,147 | 11/1974 | Anselmino | 188/181 R X |

*Primary Examiner*—Duane A. Reger
*Attorney, Agent, or Firm*—Edmund M. Jaskiewicz

[57] ABSTRACT

A mechanical antiskid regulator has a flywheel mass which is journalled for rotary movement independent of the axle and wheel and is provided with a cam received in a recess of a cam disc coupled to rotate with the wheel on the axle. Two locking elements are pivotally connected to a ring segment and are suspended from the cam disc so as to be positioned on either side of the central position of the cam. A rotatably mounted stop is engageable from either direction of rotation with the ring segment to displace the ring segment so as to move a portion of a locking element into the path of the cam to prevent the flywheel mass from deflecting in that direction.

6 Claims, 3 Drawing Figures

LOCKING DEVICE FOR A MECHANICAL ANTISKID REGULATOR

The present invention relates to a mechanical antiskid regulator for a brake system such as on railway vehicles and operated by a pressure medium, more particularly, to a locking device for such a regulator which prevents deflection of the flywheel mass in a direction as a function of the direction of rotation.

Mechanical antiskid regulators have been provided in which there is a flywheel mass which enables the regulator to respond both to retardation and to acceleration of the wheels on a railway vehicle. The flywheel mass is subjected to a swinging or oscillatory movement because of its inertia which introduces a switching operation for releasing the braking force applied to the wheel and axle. Such a swinging movement is undesireable since it leads to an unnecessary venting of the pressure medium in the brake cylinder.

In order to prevent this undesireable swinging of the flywheel mass clamping elements have been provided between the flywheel mass and the bearing sleeve. Depending on the particular direction of rotation, these clamping elements will block a deflection of the flywheel mass in one direction but will permit deflection of the flywheel mass in the other direction. The clamping elements are generally positioned between an inertia ring coaxially spaced from the axle and the axle itself and are generally contructed so as to be pivoted on forward or rearward running of the axle. The inertia ring is displaced by the axle through the action of a cam. Depending on the direction of rotation, the inertia ring is displaced to such a position that pivoting of the clamping elements is blocked in one direction but is permitted in the other direction. The clamping elements are pivoted on the flywheel mass by bolts or pins so that when the wheel is accelerated to a value which exceeds the threshold of response of the regulator, the clamping elements will become wedged between the inertia ring and the axle so as to prevent the flywheel mass from turning with respect to the axle.

The above described locking device is disadvantageous in that the forces from acceleration of the flywheel mass must be transmitted through the pins upon which the clamping elements are supported. When these acceleration forces are of a substantial magnitude, the pins may be permanently deformed. Further, the transmission of force is a function of the specific coefficients of friction between the surfaces that act upon each other. Thus, the transmission of force is determined by friction.

It has also been proposed to mount a permanent magnet upon the flywheel mass such that a pole of the magnet faces toward a soft-iron core mounted in the axle so that the flywheel mass is retained in a central position. The other pole of the magnet faces a tie rod or suitable linkage which operates a switch to actuate an electro-pneumatic venting valve. Should the flywheel mass move forward or backward with respect to the axle upon excessive acceleration or retardation of the wheel, the magnet will move correspondingly from the area of the soft-iron core and the tie rod. The rod is then displaced by a return spring to close the switch for the venting valve. When the acceleration or retardation subsides, the magnet together with the flywheel mass is returned by the soft-iron core to the original central position as result of which the rod operates to again open the switch. However, this locking device has the disadvantage that there is no provision to prevent a venting of the brake cylinder upon acceleration of the wheel nor is there any structure for preventing the occurence of oscillation of the flywheel mass.

In order to provide for friction-free transmission of braking torques, it has been proposed to employ a toothed disc which is subjected to a stationary permanent magnet located so as to act upon the teeth. Various forms of fluid couplings may also be used to transmit braking torques.

In another form of an antiskid regulator the flywheel mass is coupled to the wheel by means of a friction disc connected to the bearing sleeve and a cam pressed into a cam ring. Upon retardation of the wheel, the flywheel mass together with the cam ring and/or the cam in a recess of the friction disc will continue to rotate until the cam abuts at an end of the recess. Such an antiskid regulator responds both to retardation and to acceleration of the wheel and thus will shut off the control line for a predetermined period of time during acceleration. This device is unsatisfactory in that should there occur poor adhesion during the time of shutting off the control line the slipping of the wheel and axle would become excessive since the brake cylinder pressure could not be reduced.

It is therefore the principal object of the present invention to provide a novel and improved locking device for a mechanical antiskid regulator for a braking system particularly on a railway vehicle operated by a pressure medium.

It is another object of the present invention to provide such a locking device which is reliable in operation and permits a direct transmission of force between the wheel axle and the flywheel mass.

It is a further object of the present invention to provide such a locking device which is not only capable of smooth and reliable operation at low speeds but also at high speeds.

According to one aspect of the present invention a locking device for a mechanical antiskid regulator for a brake system particularly for railway vehicles operated by a pressure medium may comprise a flywheel mass having a cam received within a recess of a camp disc coupled to rotate with the axle. A pair of spaced locking elements are pivotally suspended on the cam disc on both sides of a central position of the cam and each of the locking elements has a flange extending into the recess. A displaceable ring segment is pivotally connected to bolts of the locking elements. Rotatably mounted stop means are provided which are engagable with either side of the ring segment from either direction of rotation to displace the ring segment to pivot a locking element such that a flange of the pivoted locking element is moved into the path of the cam to prevent the flywheel mass from deflecting in a direction as a function of the direction of rotation.

The stop means may comprise a toothed disc freely rotatable on the axle and subjected to the effect of a stationary magnet in the vicinity of the teeth of the disc. A stop member is mounted on the disc so as to be engagable with the ring segment.

As result of the present invention force is transmitted directly between the flywheel mass and the wheel axle. This force occurs by the abutment of the cam against a pivoted locking element upon acceleration of the wheel and this force is transmitted directly to the cam disc without being transmitted through any joints or mounts of the locking elements. The locking device is maintained in its corresponding position either through a toothed disc having a stop thereon and subjected to a magnet as described above or through a fluid brake disc having a stop. This positioning is also aided by centrifugal force acting upon the locking device and also, to some extent, by the positioning springs.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
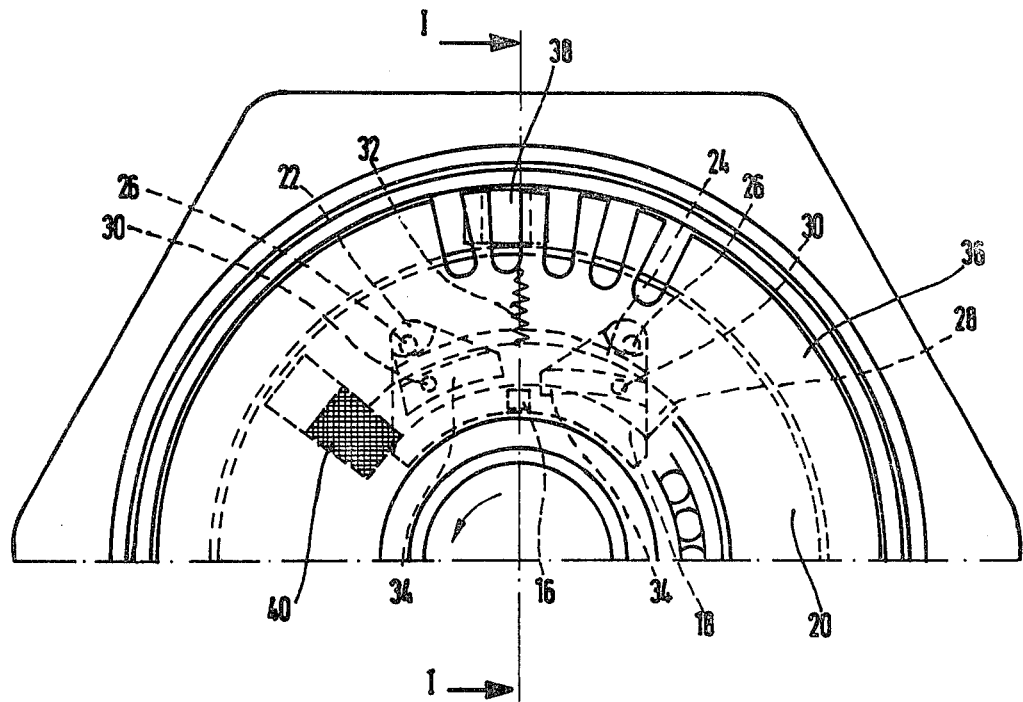
FIG. 1 is a side elevational view of the locking device according to the present invention.
Figure 2:
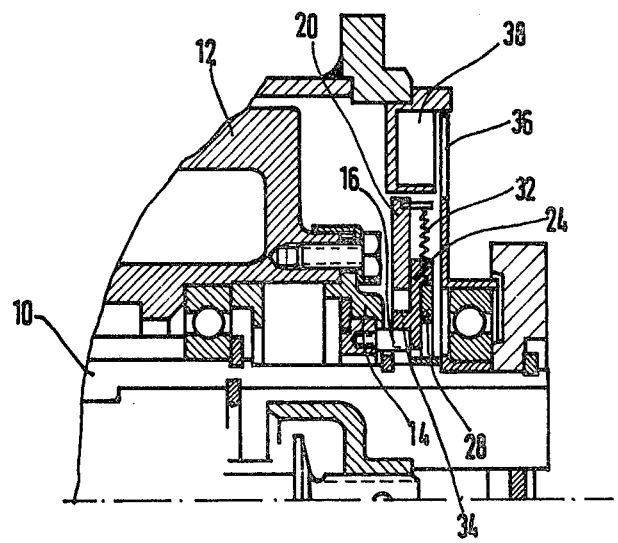
FIG. 2 is a sectional view taken through the locking device along the line I—I of FIG. 1.
Figure 3:
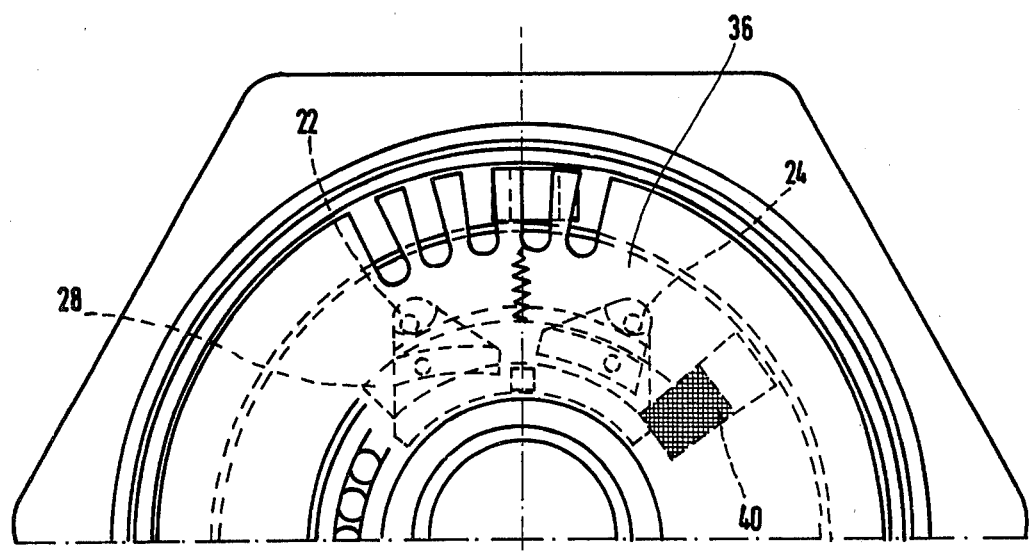
FIG. 3 is a view similar to that of FIG. 1 but showing the components of the locking device in position for the opposite direction of rotation of the axle.

As may be seen in FIGS. 1-3, the antiskid regulator of the present invention comprises a flywheel mass 12 which is journalled upon an axle of a wheel and axle assembly of a railway vehicle or journalled upon a bearing sleeve 10 as shown in FIG. 2. The flywheel mass 12 is freely rotatable with respect to the axle but is suitably coupled to the axle or wheel such as by a resilient or rubber coupling as known in the art.

A cam ring 14 is bolted or screwed on the face of the flywheel mass 12 and a cam 16 in the form of a pin or rod is pressed into the ring 14 so as to project axially therefrom. The cam 16 projects into a recess 18 formed in a cam disc 20 which is mounted in such a manner on the bearing sleeve 10 so as to be rotatable with the wheel and axle. With the cam 16 being shown in FIG. 1 in its central position the recess 18 thus permits a certain degree of movement of the cam 16 and thus enables the flywheel mass 12 together with the cam ring 14 and cam 16 to rotate through a certain angle with respect to the wheel and axle in both directions of rotation. This relative rotation of the flywheel mass is utilized to operate a valve which vents the brake cylinder. The structure for accomplishing this venting is not illustrated but is known in the art.

Two locking elements 22 and 24 are suspended on the cam disc 20 by means of bolts or pins 26. An arcuate or ring segment 28 is pivotally connected to both locking elements 22 and 24 by means of bolts or pins 30 pressed into the locking elements. The arcuate length of the ring segment 28 in the circumferential direction is approximately equal to the length of the recess 18. The ring segment 28 is biased into a central position by a relatively weak spring 32 connected between the segment 28 and the cam disc 20.

As may be best seen in FIG. 2, each of the locking elements 22 and 24 has a flange-like extension 34 which projects into the recess 18 of the cam disc 20. The size and configuration of the recess 18 in the radial direction is such that the locking elements can be pivoted through a predetermined angle in such a manner that when one locking element is pivoted out of the path of the cam 16 the other locking element has the end of its flange 34 extending into the path of the cam 16 and the other edge of this locking element contacts the edge of the recess 18. The locking elements 22 and 24 are pivoted by means of a force exerted on either end of the ring segment 28 which is thus displaced to bring about the pivoting of the locking elements.

In front of the locking device, a toothed disc 36 having radially extending teeth about its periphery is freely journalled upon the bearing sleeve 10. The teeth of the disc 36 pass in front of a permanent magnet 38 which is fixedly mounted so as to be stationary on the housing of the antiskid regulator. The toothed disc 36 has secured thereon a stop 40 which is positioned so as to engage against an end of the ring segment 28 upon rotation of the disc 36. The stop 40 is thus engagable with either end of the ring segment 28 from either direction of rotation of the disc. A pivoting of the toothed disc 36 through almost a complete revolution will position the stop 40 from one end of the ring segment 28 to its other end.

In the operation of the locking device as described above, when the wheel of the wheel and axle assembly is rotated in a counterclockwise direction as indicated by the arrow in FIG. 1, the cam disc 20 will be similarly rotated in the same direction of rotation. The toothed disc 36 will be braked by the permanent magnet 38 to lag behind with respect to the cam disc 20 until stop 40 abuts against an end of the ring segment 28 as shown in FIG. 1. The ring segment 28 will thus be displaced to the right as result of the braking force exerted by the magnet 38 on the toothed disc 36. This force will be pulsating, especially at low speeds, as result of the movement of the teeth past the magnet 38. The displacing of the ring segment 28 will move the locking elements 22 and 24 to the positions wherein flange 34 on locking element 24 engages the right hand end of recess 18 as also seen in FIG. 1.

As the cam disc 20 rotates in a counterclockwise direction the locking members 22 and 24 which are pivotally mounted by pins 26 to the cam disc 20 are carried along by the cam disc and the segment 28 is maintained in substantially a centered position by the spring 32. However, the magnetic field established by the magnet 38 and acting upon the teeth of the toothed disc 36 will brake the toothed disc 36 such that the rotation of the disc 36 will lag behind the rotation of the cam disc 20 and accordingly, the segment 28 will catch up with and contact the stop 40 as shown in FIG. 1. The braking force exerted by magnet 38 against the toothed disc 36 will cause a force to be exerted by the stop 40 against the segment 28 in a direction toward the right as viewed in FIG. 1 until the flange 34 on locking member 24 engages the right hand end of the recess 18 as shown in FIG. 1.

Thus, the magnetic force exerted by magnet 38 brakes the toothed disc 36 to enable the rotating segment 28 to, in effect, catch up with the stop 40. Otherwise, since the toothed disc is freely journalled, if no braking force were provided the segment might never catch up with stop 40 and no force would be exerted by the stop 40 sufficient to move the ring segment 28 to the right as shown in FIG. 1.

As locking member 24 is moved to its extreme right hand position as shown in FIG. 1 locking element 22 will be moved to the position as shown in FIG. 1, since these locking elements are interconnected by pins 30 to the ring segment 28. As stated above, the locking elements are so pivoted that when locking element 24 is pivoted to its extreme position as shown in FIG. 1 a portion of the flange 34 will extend into the path of the cam 16.

With respect to the operation of the locking device it is to be borne in mind that the cam disc 20 rotates with the wheel and axle assembly but the toothed disc 36 is freely journalled as shown in FIG. 2.

During a braking operation, should the vehicle wheel slip so as to be accelerated, after conventional and known antiskid brake release procedures are carried out, the cam 16 will engage the depressed end of flange 34 on the locking element 24 which has been pivoted into the path of movement of the cam 16. the interengagement of the cam 16 and locking element 24 will thus prevent a lagging of the flywheel mass 12 with respect to the cam disc 20 or to the accelerated wheel. Inertia forces will be transmitted by cam 16 through flange extensions 34 of locking element 24 directly to the right hand edge of the recess 18 as viewed in FIG. 1 of cam disc 20 so that no forces or stresses are imposed on the pivot bolts 26 and 30. The toothed disc 36 will be continuously braked or held back with respect to the cam disc 20 so that the stop 40 will retain the ring segment 28 continuously in the position shown in FIG. 1. This positioning is augmented through the force exerted by the spring 32 and by centrifugal force acting against the ring segment 28. As result, lagging of the flywheel mass 12 with respect to the railway vehicle wheel is reliably prevented. Accordingly, an unnecessary venting of the brake cylinder which would occur as a result of the oscillating of flywheel mass 12 or by an acceleration of the wheel exceeding the threshold of response is avoided.

In FIG. 3, the components of the locking device are shown in their positions when the direction of rotation of the wheel is reversed from that shown in FIG. 1 or in the clockwise direction. The locking elements 22 and 24 together with the cam disc 20 are thus moved toward the right together with the rotation of the wheel until an end of the ring segment 28 abuts against stop 40 of disc 36 which is held in position by the magnet 38. As the ring segment 38 engages the stop 40 the ring segment will be displaced toward the left as viewed in FIG. 3 and the locking elements 22 and 24 will be pivoted into their positions shown in FIG. 3 and maintained in these positions while the wheel rotates in the direction. In this position and in a manner similar to that described above the locking element 22 will prevent a lagging of the flywheel mass 12 with respect to the cam disc 20 or the wheel axle.

In order to avoid a continuous braking effect on the toothed disc 36, the magnet 38 may be mounted by a structure which pivots the magnet 38 into its illustrated position adjacent to the disc 36 only during braking operations. Otherwise, the magnet 38 is pivoted away from the disc 36.

In place of the permanent magnet 38 there can also be employed an electro-magnet which is energized only during braking operations.

As a modification, the disc 36 may be coupled to a stationary portion of the regulator by means of a fluid coupling.

It is to be borne in mind that the locking device of the present invention can also be used in centrifugal protection devices if the antiskid regulator is suitable modified. Also, the locking device can be generally employed in connection with direction-of-rotation responsive procedures of control and regulation such as would be associated with a free wheeling device which can be actuated as a function of direction of rotation or the operation of a switch or contact between two freely rotating shafts or discs. The locking device of the present invention thus provides a reliable yet simple structure for preventing relative rotation of a freely journalled mass with respect to a rotatable member.

It will be understood that this invention is susceptible to modification in order to adapt it to different usages and conditions, and accordingly, it is desired to comprehend such modifications within this invention as may fall within the scope of the appended claims.

What is claimed is:

1. A locking device for a mechanical antiskid regulator for a brake system particularly on railway vehicles operated by a pressure medium comprising a flywheel mass coupled to an axle so as to be capable of independent movement with respect to the axle, a cam on said flywheel mass and having a central position, a cam disc coupled to rotate with a wheel of the axle and having a recess therein receiving said cam, a pair of spaced locking elements pivotally suspended on said cam disc on both sides of the central position of said cam, said locking elements each having a flange extending into said recess, a displaceable ring segment pivotally connected to said locking elements, and rotatably mounted stop means engageable with either side of said ring segment from either direction of rotation to displace said ring segment to pivot a said locking element such that a flange of the pivoted locking element is moved into the path of said cam to prevent said flywheel mass from deflecting in a direction as a function of the direction of rotation.

2. A locking device as claimed in claim 1 wherein said stop means comprises a toothed disc freely rotatable on the vehicle axle and a stop on said disc, and a stationary magnet positioned to act on the teeth of said disc.

3. A locking device as claimed in claim 1 wherein said stop means comprises a toothed disc freely rotatable on the vehicle axle and a stop on said disc, and a fluid coupling between said disc and a stationary portion of the regulator.

4. A locking device as claimed in claim 1 wherein said locking elements each have a portion engaging an edge of said recess when a said lock element is pivoted.

5. A locking device as claimed in claim 1 and spring means for biasing said ring segment into a central position.

6. A locking device as claimed in claim 1 and further comprising a cam ring attached to said flywheel mass, said cam being mounted on said cam ring.

* * * * *